Oct. 7, 1969   J. W. DAVIS   3,470,746
ROTARY INERTIA VEHICLE ANTI-SKID BRAKING SYSTEMS
Filed Aug. 15, 1966   4 Sheets-Sheet 3

Oct. 7, 1969  J. W. DAVIS  3,470,746
ROTARY INERTIA VEHICLE ANTI-SKID BRAKING SYSTEMS
Filed Aug. 15, 1966  4 Sheets-Sheet 4

United States Patent Office 3,470,746
Patented Oct. 7, 1969

3,470,746
ROTARY INERTIA VEHICLE ANTISKID
BRAKING SYSTEMS
John Walter Davis, Balsall Common, England, assignor to The Dunlop Company Limited, London, England, a corporation of Great Britain
Filed Aug. 15, 1966, Ser. No. 572,376
Claims priority, application Great Britain, Aug. 24, 1966, 36,194/65
Int. Cl. G01p *15/00*
U.S. Cl. 73—514                    9 Claims

ABSTRACT OF THE DISCLOSURE

An antiskid braking system for a vehicle utilizing a rotary-inertia, skid-sensing device driven from the propeller shaft of the vehicle through a drive transmitting means and having an amount of backlash which is at least equal to the backlash between the driven wheels of the vehicle and the propeller shaft in order not to introduce an impairment of the normal working of the brakes as a consequence of antiskid operation. What is intended, therefore, is to preclude the transmission backlash from interfering with antiskid operation.

---

This invention relates to vehicle antiskid braking systems.

A vehicle antiskid braking system may include a rotary-inertia skid-sensing device driven directly or indirectly by one or more wheels of the vehicle and arranged to release a brake whenever the rate of deceleration of the wheel or wheels exceeds a predetermined value.

When a device of this kind is driven from the transmission of a vehicle, for example from the propeller shaft, problems arise as a result of the angular backlash which exists in the transmission between the engine and the road wheels. For example, when the driver takes his foot off the accelerator pedal the transmission changes from the driving to the driven attitude, and the abrupt change in speed of the propeller shaft which occurs may cause the skid-sensing device to operate before the driver applies the brakes. This may impair the normal working of the brakes, and in a braking system operated by stored energy, such as air pressure, a considerable loss of energy can be caused whenever such changes in the attitude of the transmission take place, such as when slowing down without braking or on changing gear.

The transmission backlash also adversely affects the operation of the anti-skid system when the system is operating to control the brakes in stopping the vehicle under conditions where a skid is likely to develop. Any irregularity of engine speed, such as is common in diesel engines when running slowly, can be transmitted by clutch drag and viscous drag in the gear box to the propeller shaft, causing it to oscillate within the angular limits set by the amount of transmission backlash and to cause the skid-sensing device to operate to release the brakes more frequently than is necessary to check a tendency to skid. This causes the stopping distance to be increased, since the brakes are not being used to the maximum possible extent.

According to the invention a vehicle antiskid braking system comprises a rotary-inertia skid-sensing device and drive-transmitting means to drive the rotary-inertia skid-sensing device from a drive mechanism associated with at least one wheel of the associated vehicle, the drive-transmitting means having an amount of backlash substantially equal to or greater than the angular movement at the drive-transmitting means due to backlash existing in the drive connection between the said wheel and the drive mechanism from which the skid-sensing device is driven.

According to the invention also, a rotary-inertia skid-sensing device for use in a system as defined above comprises a rotary-inertia skid-sensing device for use in a system as claimed in claim 1 comprising drive-transmitting means including a first rotatable member to be driven by a drive mechanism associated with at least one wheel of a vehicle and a second rotatable member associated with or constituting the drive shaft of the rotary-inertia device, the drive-transmitting means having a predetermined amount of backlash between the first rotatable member and the second rotatable member.

The term "backlash" as applied to a vehicle transmission is used in this specification to cover any angular movement in the transmission arising from play in the gears and couplings or angular deflection of drive-transmitting components.

Three embodiments of the invention will now be described, by way of example, with reference to the accompanying drawings, in which.

A vehicle anti-skid braking system for the driven rear wheels of a vehicle may comprise air-pressure operated brakes associated with the wheels, a skid-sensing device driven from a drive mechanism associated with the said wheels and a control valve arranged to release the brakes associated with the said driven wheels whenever the skid-sensing device operates.

Figure 1:
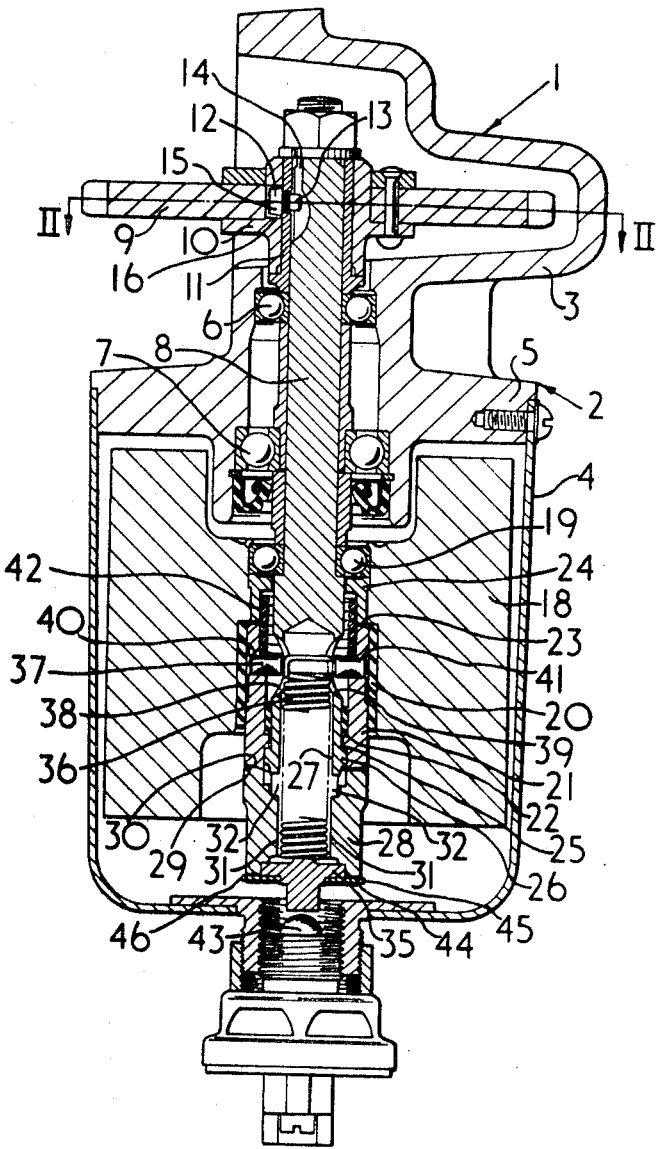
FIGURE 1 is an axial cross-section through a rotary-inertia skid-sensing device in accordance with the invention.
Figure 2:
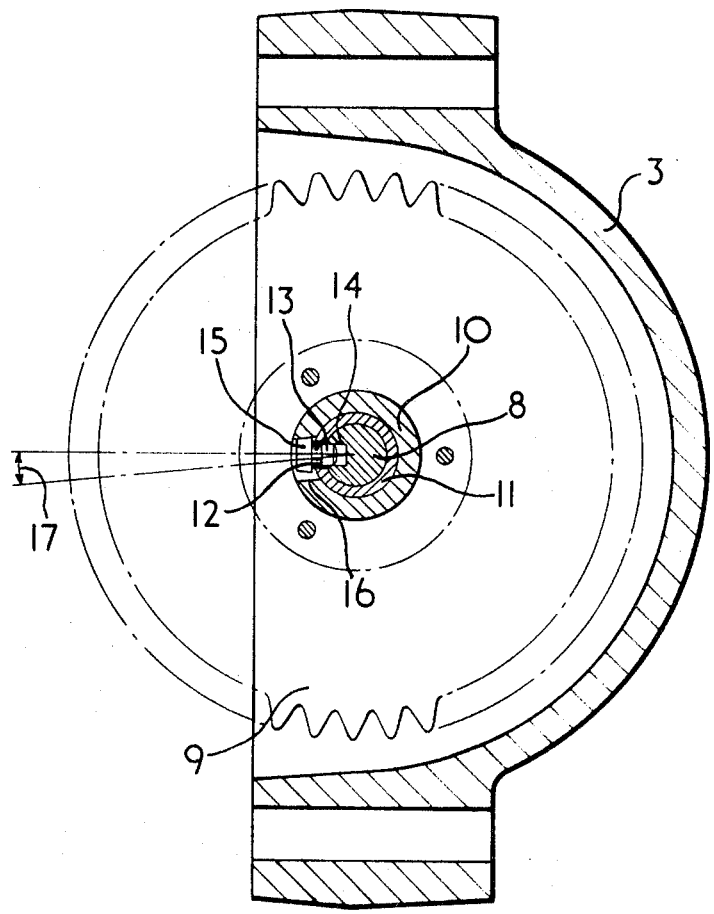
FIGURE 2 is a section on the line II—II of FIGURE 1.

The skid-sensing device 1 shown in FIGURES 1 and 2 is of the rotary-inertia type. The device 1 comprises a metal housing 2 formed from two main components, a body portion 3 and a generally cup-shaped cover portion 4. The cover portion is secured coaxially with the body portion on an outwardly directed radial flange 5 formed on the body portion.

The body portion 3 is provided with bearings 6 and 7 to support a rotatable shaft 8 passing coaxially through the body portion and arranged to be driven by means of a drive member in the form of a gear wheel 9 drivably connected to a drive shaft (not shown) for the driven wheels of an associated vehicle. The gear wheel 9 is secured to a flanged bush 10 which is mounted on the shaft 8 so as to be capable of relative rotation through a predetermined angle with respect to the shaft 8. The flanged bush 10 is mounted on a bearing sleeve 11 in which a peg 12 is press-fitted. The peg 12 has a shank portion 13 which engages an axial keyway 14 formed in the shaft 8, and a frusto-conical head portion 15 which engages a slot 16 formed in the bush 10. The slot 16 is of sufficient width, considered in the circumferential direction with respect to the shaft 8, to permit the gear wheel 9 to rotate through an angle 17 (see FIGURE 2) relative to the shaft 8.

The angle 17 constitutes "backlash" in the drive connection between a first rotatable member consisting of the gear wheel 9 and bush 10 and a second rotatable member consisting of the shaft 8 and bearing sleeve 11. The purpose of providing backlash in the drive connection is to enable the rotary-inertia skid-sensing device to be driven from a drive mechanism associated with a vehicle wheel, such as a propeller shaft or gear train, without incurring the risk that the device will be subjected to the decelerations, referred to above, which would occur as a result of transmission backlash. The backlash represented by the angle 17 is chosen so that it is equal to or slightly greater than the backlash existing in the drive connection between the associated vehicle wheel and the drive mechanism from which the rotary-inertia skid-sensing device is driven.

The construction and operation of the remaining portions of the skid-sensing device, which is described in the specification of our copending U.K. patent application No. 36,195/65, is as follows:

An annular flywheel 18 is rotatably mounted coaxially with the rotatable shaft 8, the flywheel being supported at one end by a bearing 19 carried on the shaft 8 and at the other end by the outer surface of a low-friction bush 20 fitted around the outer surface of a first hollow cylindrical cam member 21 which is itself rotatably mounted on the shaft 8, a second low-friction bush 22 being provided between the inner surface of the cam member 21 and the shaft.

The first cam member 21 is located against axial movement by its engagement at one end with a shoulder 23 formed by the end of a sleeve 24 drivably fitted to the flywheel, and by the provision of an inwardly projecting annular lip 25 engaging a corresponding lip 26 formed on the shaft 8 to prevent axial movement of the first cam member 21 away from the flywheel.

The shaft 8 is bored from its end within the cover portion 4 to provide a hollow portion 27 coextensive with the first cam member 21 with a second hollow cylindrical cam member 28 which has an end face 29 adjoining the corresponding end face 30 of the first cam member 21 and extends coaxially around the end of the shaft 8. The second cam member 28 is drivably secured to the shaft 8 by radially inwardly projecting keys 31 formed on the cam member which engage axially extending slots 32 formed in the shaft 8, the second cam member 28 thus being capable of axial displacement on the shaft whilst being secured against rotation relative to the shaft. The second cam member 28 is formed from a low-friction plastic material.

The adjoining end faces 29, 30 of the cam members 28, 21 are formed with pairs of complementary cam surfaces, the arrangement being such that rotation of the cam members relative to one another about the axis of the shaft causes the members to be forced axially apart. The second cam member 28 is provided with a fastening member in the form of an end cap 35 which forms an anchoring point for one end of a coiled torsion spring 36 which is located coaxially within the hollow end of the shaft and is fastened at its other end to a transverse peg 37. The spring 36 is secured to the end cap 35 against tension and torsion stresses.

The ends of the transverse peg 37 pass, respectively, through a pair of clearance holes 38, 39 of frusto-conical form bored transversely in the wall of the hollow portion 27 of the shaft 8 at diametrically opposite points, and are push-fitted in diametrically opposite holes 40, 41 formed in the first cam member 21. The transverse peg 37 thus serves to drivably connect the first cam member 21 to the shaft 8 whenever the shaft is turned through an angle exceeding the clearance afforded by the frusto-conical holes 38, 39.

The first cam member 21 is drivably connected to the flywheel 18 by a coiled clutch spring 42 one end of which fits within the inner surface of the cam member 21 and the other end of which fits within a corresponding bore of equal diameter formed in the sleeve 24 which rotates with the flywheel. The clutch spring 42 is wound so that when the shaft 8 is rotated by a vehicle transmission, via the gear wheel 9, in the normal direction for forward movement of the associated vehicle the first cam member 21, driven by the transverse peg 37, applies a torque to the clutch spring 42 which tends to "unwind" the spring 42 and force it to expand radially outwardly to grip the inner surfaces of the cam member 21 and the sleeve 24 secured to the flywheel 18. This provides a positive drive coupling which ensures that the flywheel 18 is driven at the same speed of rotation as the shaft 8 so long as the associated road wheels' speed is steady or increasing. Following the normal manner of operation of a rotary-inertia antiskid device, when the speed of the road wheels falls the clutch spring 42 tends to wind up as the flywheel 18 overruns the shaft 8, and the clutch spring slips to allow the flywheel to continue to rotate at a higher speed than the shaft, whilst continuing to exert a frictional drag torque on the flywheel and a corresponding drag torque on the first cam member 21.

The drag torque exerted on the first cam member 21 tends to rotate the member 21 and its transverse peg 37, This tendency to rotate is opposed by the interaction of the cam surfaces of the first and second cam members which are pressed together by axial tension from the torsion spring 36, and also by the torque set up in the torsion spring 36 as the transverse peg 37 tends to turn one end of the spring 36 relative to the other end.

As is usual in the operation of a rotary-inertia skid-sensing device, when the rate of deceleration of the shaft 8 exceeds a predetermined value, indicating an imminent wheel-locking condition, the cam members 21, 28 are moved apart axially by a certain distance, and when this occurs the end cap 35 is arranged to contact an actuating device 43 for a skid-correcting system mounted coaxially in the cover portion 4 of the housing. In the arrangement illustrated the device 43 is an electrical switch, connected in an electrical circuit for operating a valve to release the associated brakes, but in an alternative arrangement the cap 35 may be arranged to actuate a fluid-pressure valve directly. The switch 43 is arranged to effect the release of the brakes associated with the driven wheels of the vehicle until the rate of deceleration of the wheels is reduced sufficiently to avoid skidding.

The end cap 35 to which the torsion spring 36 is attached is provided with a flange 44 having a pair of radially outwardly projecting ears 45, 46 for engagement with the end of the second cam member 28, the end of the second cam member having a series of notches cut around its periphery to enable the ears of the end cap to be locked in position to hold the end cap against rotation relative to the cam member. This enables the torsion spring 36 to be pre-stressed to any required torque value, and thus provides means for setting up the device for operation at a predetermined deceleration rate.

Figure 3:
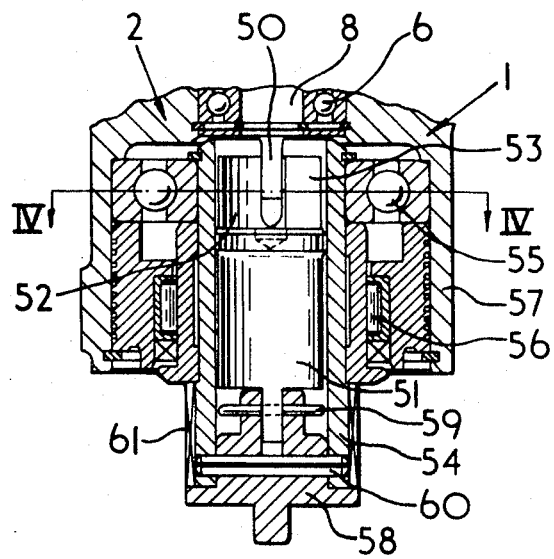
FIGURE 3 is an axial cross-section through part of a rotary-inertia device similar to that shown in FIGURE 1 but incorporating an alternative drive-transmitting means.
Figure 4:
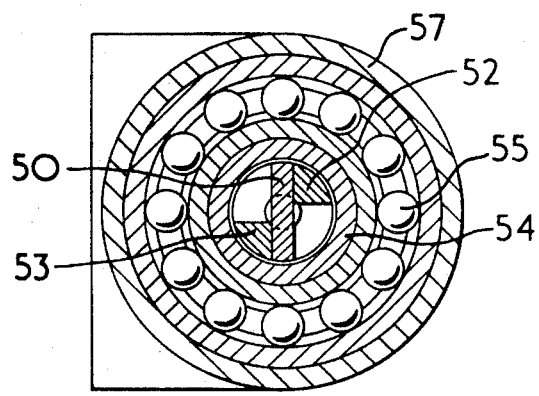
FIGURE 4 is a cross-section on the line IV—IV of FIGURE 3.

An alternative drive-transmitting means is illustrated in FIGURES 3 and 4. In this arrangement the shaft 8 of the rotary-inertia device 1 is provided with a tongue 50 projecting axially outwardly from the end of the shaft. The tongue 50 is engageable by a connecting member in the form of a cylindrical member 51 having an axially inner end which is forked to provide a pair of axially-extending arms 52 and 53, the tongue 50 extending between the arms 52 and 53.

The member 51 is supported within a first rotatable member 54 of hollow cylindrical form, which is rotatably supported by bearings 55 and 56 in an axially-extended portion 57 of the housing 2. The member 51 is secured to an end cap 58 of the member 54 by means of a clevis pin 59 and the end cap is detachably secured to the member 54 by a pin 60. The member 54 is rotatable about an axis coaxial with that of the shaft 8, and is provided with splines 61 for engagement with the teeth of a toothed drive belt (not shown) by which the skid-sensing device may be driven from a corresponding pulley associated with the vehicle drive mechanism.

The arrangement shown in FIGURES 3 and 4 has the advantage that no frictional torque is transmitted to the drive shaft 8 during relative rotation of the connecting member 54 and the drive shaft 8 to take up the backlash provided by the gap between the arms 52 and 53.

Figure 6:
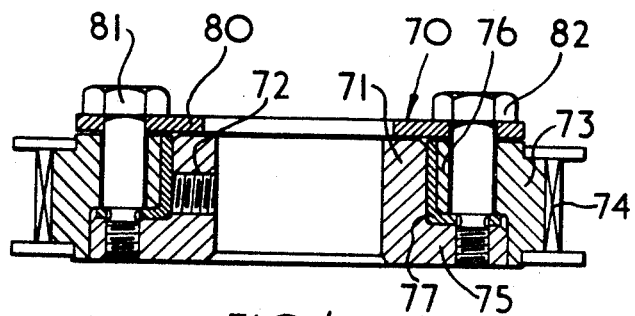
FIGURE 6 is an axial cross-section on the line VI—VI of FIGURE 5.
Figure 5:
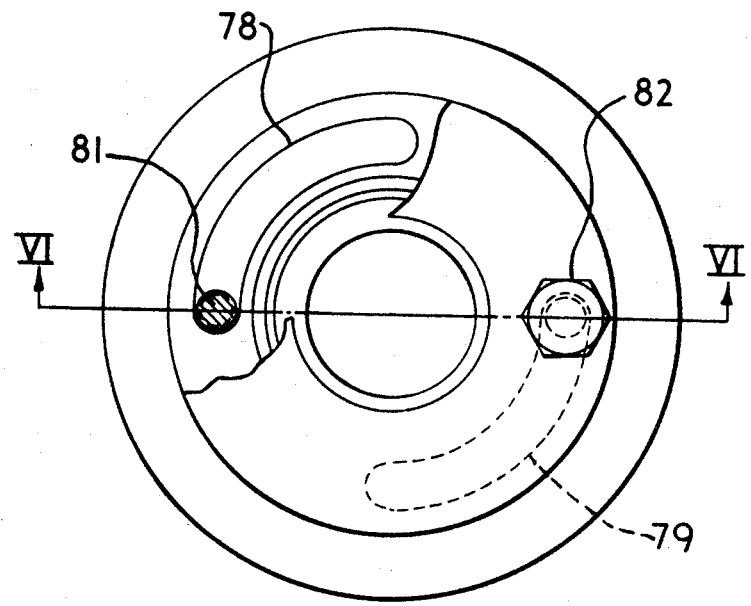
FIGURE 5 is an axial end view, partly cut-away, showing a further alternative drive-transmitting means.

A further alternative drive-transmitting means is shown in FIGURES 5 and 6. In this embodiment, the shaft 8 of the skid-sensing device is arranged to be coupled to the propeller shaft of the vehicle by means of a flexible toothed belt (not shown) drivably engaging toothed pulleys attached respectively to the propeller shaft and the shaft of the skid-sensing device.

The pulley 70 associated with the skid-sensing device comprises a body portion 71 arranged to be secured to the shaft 8 by means of a grub screw located in a screw-threaded radial hole 72 and a flanged rim portion 73 which is rotatably mounted coaxially with the body portion 71 and is provided with teeth 74 to engage the belt. The body portion 71 is generally cylindrical in form and has a radially-outwardly projecting flange 75 at one end, the rim portion 73 being of complementary form and having an inwardly projecting flange 76. The two portions are arranged to fit coaxially together with sufficient clearance to enable a flanged brass bush 77 to be fitted between the two portions to provide a bearing surface on which the rim portion 73 can rotate.

The inwardly projecting flange 76 of the rim portion is provided with two arcuate slots 78, 79 concentric with the pulley in diametrically opposed positions, the length of each slot subtending an angle of 90° at the centre of the pulley. An annular retaining plate 80 is fastened by two bolts 81, 82 to the flange 75 of the body portion 71 to hold the rim portion 73 in position, the bolts 81, 82 being located in diametrically opposed positions and passing through the arcuate slots 78, 79 to form stops which limit the possible relative displacement of the rim and body portions of the pulley to 90°. Although the present invention has been illustrated and described in connection with the preselected example embodiment, will be understood that this is illustrative of the invention and it is by no means restrictive thereof.

It is reasonable to be expected that those skilled in this art can make numerous revisions and adaptations of the invention and it is intended that such revisions and adaptations will be included within the scope of the following claims as equivalents of the invention.

Having now described my invention, what I claim is:

1. In a vehicle antiskid braking system, a drive mechanism for driving at least one wheel of the associated vehicle, a drive connection combined with said drive mechanism and operatively connected to said one wheel, drive transmitting means also combined with said drive mechanism, a rotary-inertia skid-sensing device combined with said drive transmitting means to be driven thereby, said drive connection having an amount of backlash to provide angular movement relative to the associated wheel as driving forces transmitted therethrough, said drive transmitting means also having an amount of backlash whereby said drive mechanism can move angularly relative to said skid-sensing device, the amount of backlash and said drive transmitting means being proportioned relatively to the angular movement of said drive mechanism and the backlash therein relatively to the drive transmitting means, and is at least equal to the angular movement in the drive connection between said drive mechanism and said rotary inertia skid-sensing device.

2. A rotary inertia skid-sensing device as claimed in claim 1 comprising a shaft and rotatable element disposed coaxially with said shaft and rotatable therewith, said rotatable element also being rotatable relatively to said shaft as the rate of deceleration of said shaft exceeds a predetermined value, said drive transmitting means including a first rotatable member adapted to be driven by said drive mechanism associated with said one vehicle wheel, and a second rotatable member operatively combined with said drive shaft of said rotary inertia device, said drive-transmitting means including a predetermined amount of backlash between said first rotatable member and said second rotatable member.

3. A device according to claim 1 wherein the first rotatable drive member is mounted on the drive shaft of the device and is capable of relative rotation with respect to the drive shaft through a predetermined angle.

4. A device according to claim 3 wherein the first rotatable member is rotatably secured at the end of the drive shaft in a fixed axial position, the drive from the first rotatable member to the drive shaft being transmitted through a peg secured to the drive shaft and engaged in a slot of predetermined circumferential width formed in the first rotatable member.

5. A device according to claim 1 wherein the first rotatable member is rotatably mounted on a portion of a housing of the rotary-inertia device coaxial with and adjacent an end of the drive shaft and comprises a connecting member engageable with a corresponding member at the end of the drive shaft to transmit drive from the first rotatable member to the drive shaft, a predetermined amount of backlash being provided between the connecting member and the corresponding member at the end of the drive shaft.

6. A device according to claim 5 wherein the connecting member and the corresponding member at the end of the drive shaft form a drive connection in which one member is forked to provide a pair of axially-extending arms and the other member extends between the arms and is engageable thereby.

7. A device according to claim 6 wherein the first rotatable member is of hollow cylindrical form and is rotatably supported within a portion of the housing, the connecting member being in the form of a cylindrical member located within the first rotatable member and secured thereto at its axially outer end, the axially inner end of the connecting member being forked to provide said pair of axially-extending arms and the axially outer end of the drive shaft being formed with a member in the form of an outwardly projecting tongue extending between the arms.

8. A device according to claim 1 wherein the first and second rotatable members together form a drive-transmitting means detachably mounted on the drive shaft, the drive-transmitting means comprising a first rotatable member in the form of a rim portion mounted on and drivably associated with a second rotatable member in the form of a body portion which is drivably secured to the drive shaft, the rim portion being freely rotatable through a limited angle about the axis of the body portion.

9. A device according to claim 8 wherein the body portion has a radially outwardly projecting flange and the rim portion has a radially inwardly projecting flange, the flanges lying alongside one another, the flange of the rim portion being retained in position adjacent the flange of the body portion by means of a retaining plate secured to the flange of the body portion by a pair of fastening members passing through the retaining plate and through arcuate slots formed in the flange of the rim portion and secured to the flange of the body portion.

References Cited

UNITED STATES PATENTS 2,068,370  1/1937  Bush.
2,381,225  8/1945  Newell.
2,687,047  8/1954  O'Connor _____ 73—514 XR JAMES J. GILL, Primary Examiner